US008683360B2

(12) United States Patent
Aso et al.

(10) Patent No.: US 8,683,360 B2
(45) Date of Patent: Mar. 25, 2014

(54) SUPPORT DEVICE, COMPUTER-READABLE RECORDING MEDIUM, DESIGN SUPPORT METHOD AND INTEGRATED CIRCUIT

(75) Inventors: Mitsuhiro Aso, Osaka (JP); Hidehiko Shin, Osaka (JP)

(73) Assignee: Panasonic Corporation, Osaka (JP)

( * ) Notice: Subject to any disclaimer, the term of this patent is extended or adjusted under 35 U.S.C. 154(b) by 39 days.

(21) Appl. No.: 13/395,556

(22) PCT Filed: Jun. 23, 2011

(86) PCT No.: PCT/JP2011/003597
§ 371 (c)(1),
(2), (4) Date: Mar. 12, 2012

(87) PCT Pub. No.: WO2012/008099
PCT Pub. Date: Jan. 19, 2012

(65) Prior Publication Data
US 2012/0198370 A1 Aug. 2, 2012

(30) Foreign Application Priority Data
Jul. 12, 2010 (JP) ................................. 2010-158227

(51) Int. Cl.
*G06F 3/048* (2013.01)
(52) U.S. Cl.
USPC ......................................................... 715/763
(58) Field of Classification Search
None
See application file for complete search history.

(56) References Cited

U.S. PATENT DOCUMENTS 5,973,694 A * 10/1999 Steele et al. ................... 715/835
6,002,401 A * 12/1999 Baker ............................ 715/839
2003/0107604 A1 * 6/2003 Ording ........................... 345/788
2004/0036913 A1 * 2/2004 Yasuho et al. ................ 358/1.16
2005/0108656 A1 * 5/2005 Wu et al. ....................... 715/801
2006/0288305 A1 * 12/2006 Liu ................................ 715/800
2007/0198534 A1 * 8/2007 Hon et al. ....................... 707/10
2008/0252646 A1 * 10/2008 Pelletier et al. ............... 345/474

FOREIGN PATENT DOCUMENTS

| JP | 7-210652 | 8/1995 |
| JP | 2003-331311 | 11/2003 |
| JP | 2005-196669 | 7/2005 |
| JP | 2009-151693 | 7/2009 |

OTHER PUBLICATIONS

Section "C. Documents Considered to Be Relevant" on p. 1 of International Search Report issued Sep. 20, 2011 in International (PCT) Application No. PCT/JP2011/003597.
Flash CS4 Professional "ActionScript 3.0 Language Reference" located at URL: http://help.adobe.com/en_US/FlashPlatform/reference/actionscript/3/flash/profiler/package.html #showRedrawRegions( ), Jul. 29, 2009.

* cited by examiner

*Primary Examiner* — William Bashore
*Assistant Examiner* — Rayeez Chowdhury
(74) *Attorney, Agent, or Firm* — Wenderoth, Lind & Ponack, L.L.P.

(57) ABSTRACT

A redrawing area displaying unit sets a redrawing area SD based on an area redrawn by a drawing processing unit in each frame, and displays an image representing the set redrawing area SD by overlapping the image on a GUI. Each time a frame of the GUI is updated by the drawing processing unit, a target redrawing area displaying unit measures a drawing processing time TS of the updated frame, and when the measured drawing processing time TS exceeds a predetermined reference processing time TR, calculates a target redrawing area MD that is drawable within the reference processing time TR, and overlaps an image representing the calculated target redrawing area MD on an excess frame and displays this image.

11 Claims, 8 Drawing Sheets

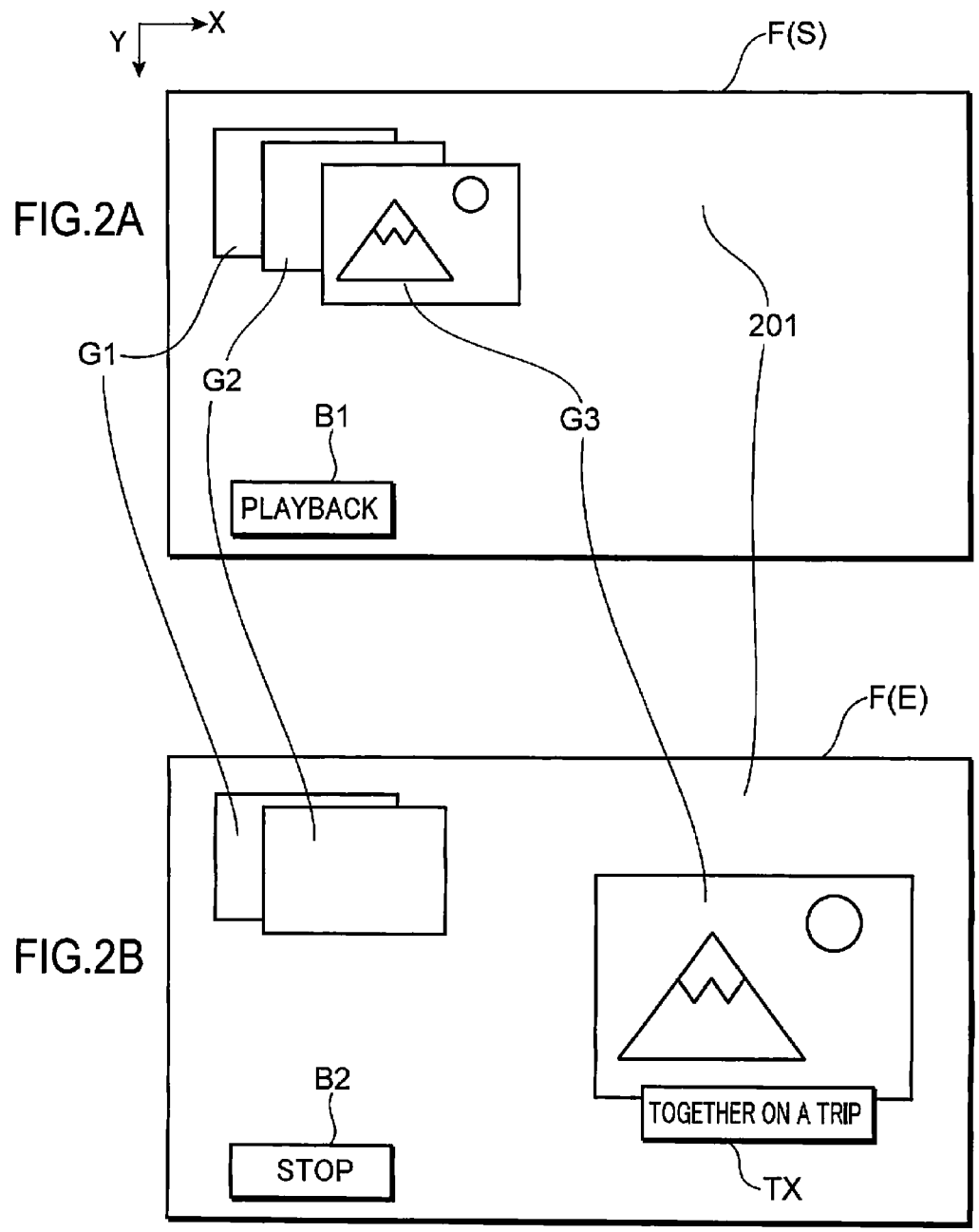

FIG.3A

ATTRIBUTE INFORMATION  TB(S)

| COMPONENT ID | STACKING ORDER | COMPONENT TYPE | DISPLAY POSITION (x,y) | DISPLAY SIZE (w,h) | TRANSPARENCY |
|---|---|---|---|---|---|
| 3202 | 1 | BUTTON | 150,840 | 320,120 | 1.0 |
| 3203 | 2 | BUTTON | 150,840 | 320,120 | 0.0 |
| 3204 | 2 | CHARACTER | 1160,840 | 500,120 | 0.0 |
| 3205 | 1 | IMAGE | 140,120 | 400,300 | 1.0 |
| 3206 | 1 | IMAGE | 240,150 | 400,300 | 1.0 |
| 3207 | 1 | IMAGE | 380,200 | 400,300 | 1.0 |

| COMPONENT ID | STACKING ORDER | COMPONENT TYPE | DISPLAY POSITION (x,y) | DISPLAY SIZE (w,h) | TRANSPARENCY |
|---|---|---|---|---|---|
| 3202 | 1 | BUTTON | 150,840 | 320,120 | 0.0 |
| 3203 | 2 | BUTTON | 150,840 | 320,120 | 1.0 |
| 3204 | 2 | CHARACTER | 1160,840 | 500,120 | 1.0 |
| 3205 | 1 | IMAGE | 140,120 | 400,300 | 1.0 |
| 3206 | 1 | IMAGE | 240,150 | 400,300 | 1.0 |
| 3207 | 1 | IMAGE | 1000,320 | 800,600 | 1.0 |

TBS

| ELAPSED TIME | ΔTmsec |
|---|---|
| LINK INFORMATION | ATTRIBUTE INFORMATION ID30011 |
| PERFORMANCE VALUE | 30msec |

TB

ATTRIBUTE INFORMATION ID:30011

| COMPONENT ID | STACKING ORDER | COMPONENT TYPE | DISPLAY POSITION (x,y) | DISPLAY SIZE (w,h) | TRANSPARENCY |
|---|---|---|---|---|---|
| 3202 | 1 | BUTTON | 150,840 | 320,120 | 0.0 |
| 3203 | 2 | BUTTON | 150,840 | 320,120 | 1.0 |
| 3204 | 2 | CHARACTER | 1160,840 | 500,120 | 0.0 |
| 3205 | 1 | IMAGE | 140,120 | 400,300 | 1.0 |
| 3206 | 1 | IMAGE | 240,150 | 400,300 | 1.0 |
| 3207 | 1 | IMAGE | 480,280 | 520,360 | 1.0 |

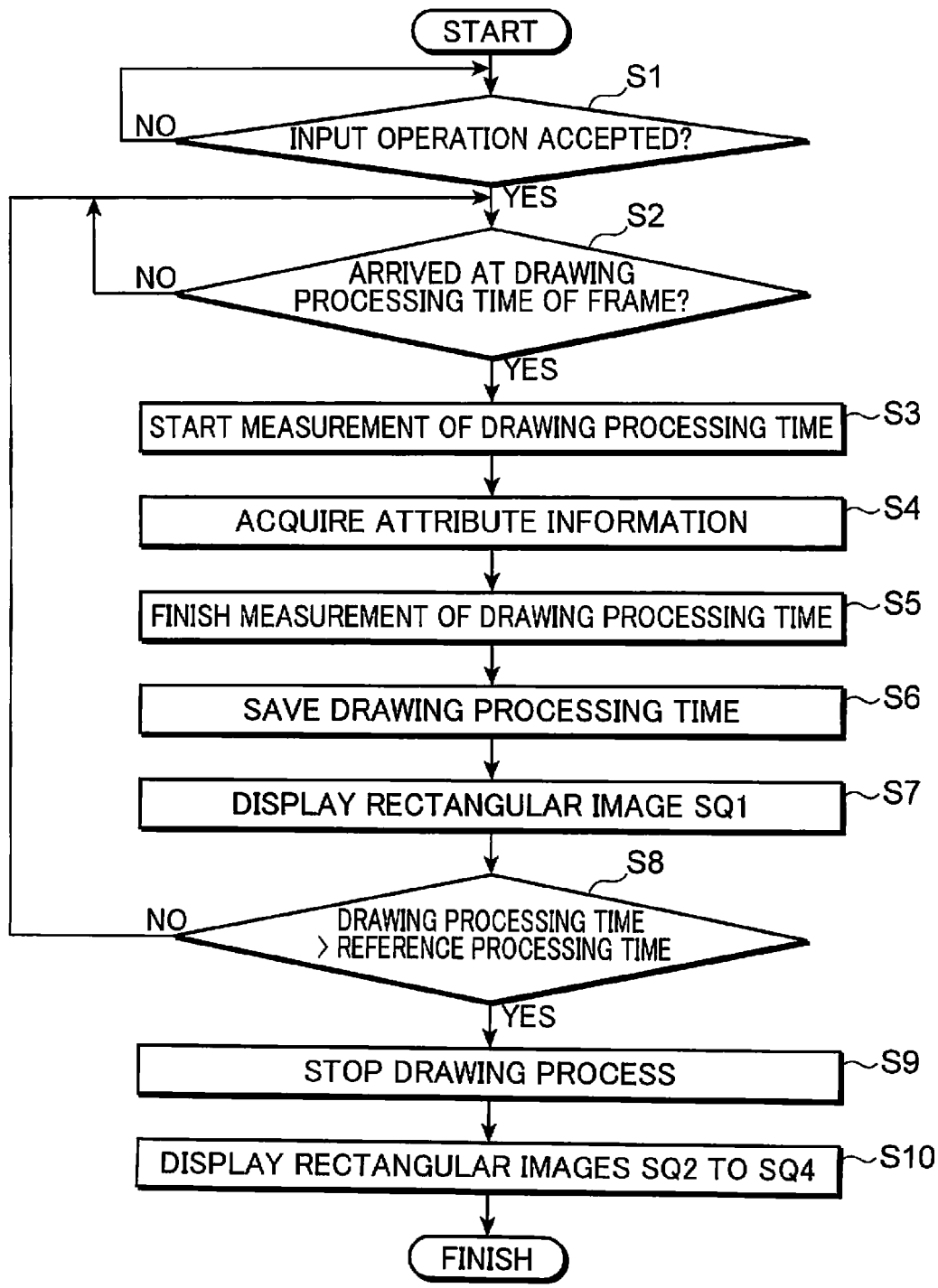

SUPPORT DEVICE, COMPUTER-READABLE RECORDING MEDIUM, DESIGN SUPPORT METHOD AND INTEGRATED CIRCUIT

BACKGROUND OF THE INVENTION

1. Technical Field

The present invention relates to a technique for supporting designing of a GUI (graphical user interface).

2. Background Art

In recent years, graphical user interfaces (hereinafter, referred to as "GUIs") are widely adopted in digital instruments such as digital television sets, recorders, and mobile telephones. A GUI is made up of GUI components including buttons, images, and data display lists.

By operating GUI components displayed on a screen of a display unit via an input device such as a mouse, a keyboard, and a remote controller, a user is capable of using numerous functions provided in a digital instrument.

In addition to enabling a user to easily invoke and use functions of a digital instrument, a GUI of a digital instrument is also required to make an operation of the digital instrument itself a fun experience and to enhance designability of the digital instrument.

Therefore, more and more digital instruments are being mounted with GUIs which not only draw still images but are also eye-catching and fun to use due to the utilization of animation, visual effects, and the like.

On the other hand, heavy use of animation, visual effects, and the like increases drawing throughput of a GUI. Therefore, there may be cases where a limited hardware performance of a digital instrument is unable to draw a GUI at an expected performance. For example, there may be cases where a GUI animation that is smooth and beautiful ends up being drawn as a stuttering, clumsy animation.

When a GUI cannot be drawn at an expected performance, an animation or a visual effect adopted for the purpose of enhancing designability of the GUI or making the GUI easier and fun to use conversely becomes a factor which degrades designability of the GUI or inhibits user operability of the GUI.

Therefore, a GUI designer must design a GUI with full consideration given to balancing designability and usability of the GUI with GUI performance. In addition, when a GUI cannot be drawn at an expected performance, a design of the GUI must be improved in order to ensure that the GUI is drawn at the expected performance.

In order to improve design as described above, the GUI designer must be aware of how a design change of a GUI affects performance of the GUI on a digital instrument. However, for a designer without expert knowledge, it is difficult to understand performance of hardware (CPU speed performance, memory read/write performance, graphics hardware processing performance, and the like) or a software program structure of the digital instrument which determines GUI performance.

As prior art for addressing such issues, for example, Non-Patent Document 1 discloses a known technique for visually notifying a designer of a GUI performance lowering factor by displaying a graphic representing a GUI redrawing area overlapped on a display of the GUI.

In other words, when displaying a GUI as an animation, instead of an entire area of a display screen being redrawn for each frame, only a difference image between a previous frame and a current frame is redrawn in the current frame. In addition, the greater the surface area of the redrawn area, the greater the GUI drawing processing time and the lower the GUI performance.

In consideration thereof, in Non-Patent Document 1, by highlighting an outline of a redrawn area using a bold line, an association between GUI performance and GUI design is notified to the designer. Furthermore, in Non-Patent Document 1, the designer determines from the highlighted image that GUI performance has decreased due to a large redrawn area, and changes the design of the GUI so as to reduce the redrawn area.

However, in Non-Patent Document 1, highlighting of a redrawn area is merely overlapped on the GUI when drawing of the GUI is updated. Therefore, when displaying the GUI as an animation, the bold lines indicating outlines of areas that are redrawn with the updating of frames are also successively updated, which makes it difficult to determine in which frame a decrease in drawing performance has occurred. In addition, Non-Patent Document 1 does not present any information representing improvements that should be made on a GUI such as how much a surface area of a redrawn area must be reduced in order to prevent degradation in GUI performance. Therefore, the user cannot promptly understand improvements that should be made on the GUI.

Non-Patent Document 1: ActionScript 3.0 Language and Components Reference

SUMMARY OF THE INVENTION

An object of the present invention is to provide a design support device, a design support program, a design support method, and an integrated circuit which enable even a user without expert knowledge regarding hardware and software that execute a GUI to promptly recognize improvements that should be made on a GUI.

A design support device according to an aspect of the present invention is a design support device that supports designing of a GUI (graphical user interface), and has: an attribute information storing unit which stores, in advance, attribute information for displaying a GUI that is a display object as an animation; a drawing processing unit which, when a user inputs a drawing start command by using an input device, starts a drawing process of the GUI based on the attribute information and displays the GUI as an animation by redrawing a difference image of consecutive frames in a time series; a redrawing area displaying unit which sets a redrawing area based on an area redrawn by the drawing processing unit and displays an image representing the set redrawing area by overlapping the image on the GUI; and a target redrawing area displaying unit which measures a drawing processing time of an updated frame each time a frame of the GUI is updated by the drawing processing unit, and when the measured drawing processing time exceeds a predetermined reference processing time, calculates a target redrawing area that is drawable within the reference processing time and displays an image representing the calculated target redrawing area by overlapping the image on an excess frame that is a frame at which the drawing processing time exceeds the reference processing time.

In addition, computer-readable recording medium according to another aspect of the present invention is computer-readable recording medium which stores a design support program that supports designing of a GUI (graphical user interface), and causes a computer to function as: an attribute information storing unit which stores, in advance, attribute information for displaying a GUI that is a display object as an animation; a drawing processing unit which, when a user inputs a drawing start command by using an input device, starts a drawing process of the GUI based on the attribute information and displays the GUI as an animation by redrawing a difference image of consecutive frames in a time series; a redrawing area displaying unit which sets a redrawing area based on an area redrawn by the drawing processing unit and displays an image representing the set redrawing area by overlapping the image on the GUI; and a target redrawing area displaying unit which measures a drawing processing time of an updated frame each time a frame of the GUI is updated by the drawing processing unit, and when the measured drawing processing time exceeds a predetermined reference processing time, calculates a target redrawing area that is drawable within the reference processing time and displays an image representing the calculated target redrawing area by overlapping the image on an excess frame that is a frame at which the drawing processing time exceeds the reference processing time.

Furthermore, a design support method according to yet another aspect of the present invention is a design support method of supporting designing of a GUI (graphical user interface), and includes: having a computer start, when a user inputs a drawing start command by using an input device, a drawing process of a GUI that is a display object based on attribute information stored in advance for displaying the GUI as an animation, and display the GUI as an animation by redrawing a difference image of consecutive frames in a time series; having the computer set a redrawing area based on an area redrawn in the drawing processing step and display an image representing the set redrawing area by overlapping the image on the GUI; and having the computer measure a drawing processing time of an updated frame each time a frame of the GUI is updated in the drawing processing step, and when the measured drawing processing time exceeds a predetermined reference processing time, calculate a target redrawing area that is drawable within the reference processing time and display an image representing the calculated target redrawing area by overlapping the image on an excess frame that is a frame at which the drawing processing time exceeds the reference processing time.

Moreover, an integrated circuit according to still another aspect of the present invention is an integrated circuit that supports designing of a GUI (graphical user interface), and has: a drawing processing unit which starts, when a user inputs a drawing start command by using an input device, a drawing process of a GUI that is a display object based on attribute information stored in advance for displaying the GUI as an animation, and displays the GUI as an animation by redrawing a difference image of consecutive frames in a time series; a redrawing area displaying unit which sets a redrawing area based on an area redrawn by the drawing processing unit and displays an image representing the set redrawing area by overlapping the image on the GUI; and a target redrawing area displaying unit which measures a drawing processing time of an updated frame each time a frame of the GUI is updated by the drawing processing unit, and when the measured drawing processing time exceeds a predetermined reference processing time, calculates a target redrawing area that is drawable within the reference processing time and displays an image representing the calculated target redrawing area by overlapping the image on an excess frame that is a frame at which the drawing processing time exceeds the reference processing time.

BRIEF DESCRIPTION OF THE DRAWINGS

FIGS. 2A and 2B are diagrams showing examples of a GUI drawn by the design support device according to the present embodiment.

FIGS. 3A and 3B are diagrams showing examples of a data structure of attribute information stored in an attribute information storing unit.

FIG. 7 is a flow chart showing processes performed by a design support device according to an embodiment of the present invention.

DETAILED DESCRIPTION OF THE INVENTION

Figure 1:
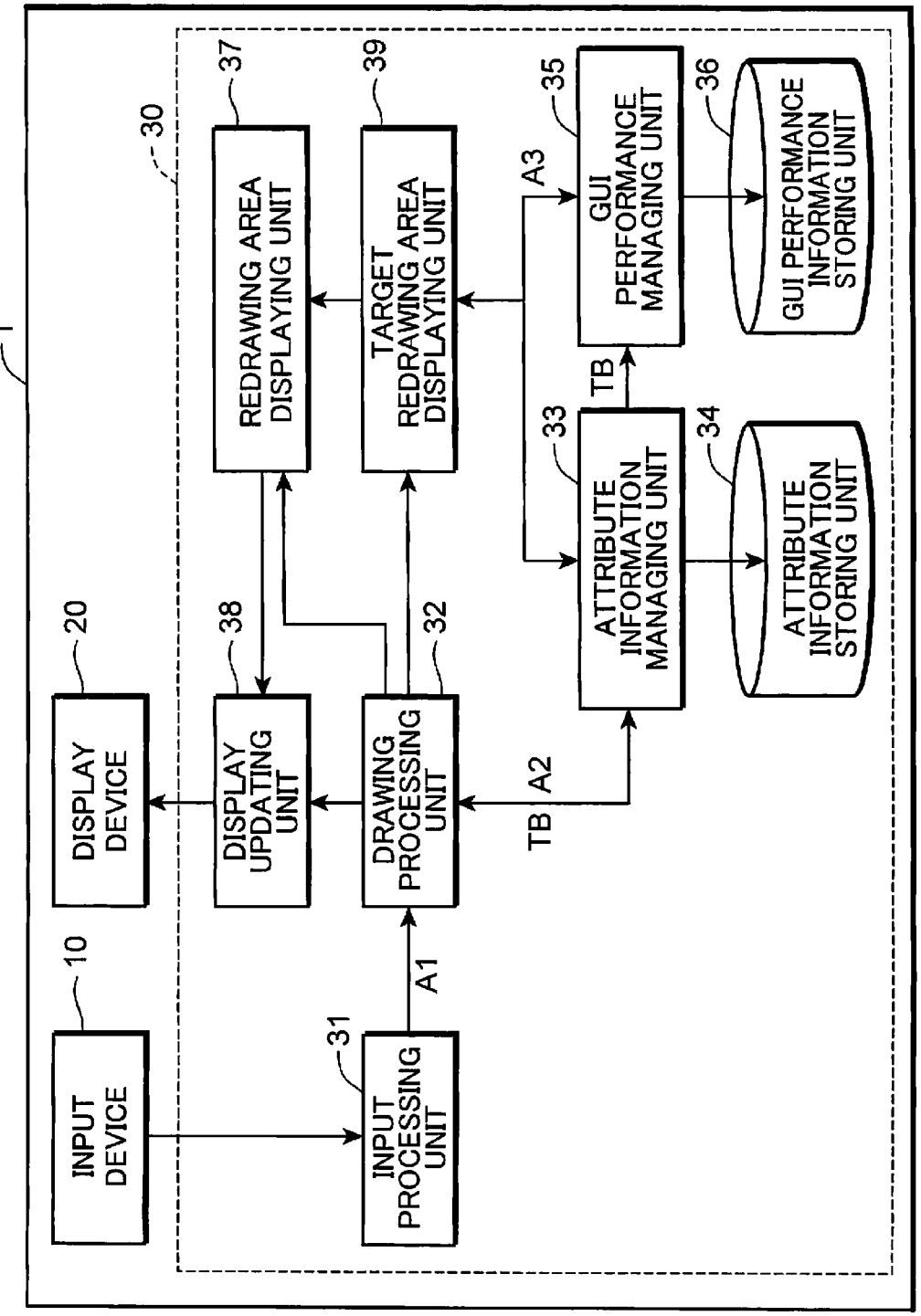
FIG. 1 is a block diagram of a digital instrument to which a design support device according to an embodiment of the present invention is applied.

Hereinafter, an embodiment of the present invention will be described with reference to the drawings. FIG. 1 is a block diagram of a digital instrument 1 to which a design support device 30 according to an embodiment of the present invention is applied. The design support device 30 is a device which supports designing of a GUI that is executed by the digital instrument 1. Therefore, a mode is conceivable in which the design support device 30 is mounted to a computer separate from the digital instrument 1 that is a GUI design object, and a GUI designed by a professional user such as a designer using the computer is mounted to the digital instrument 1.

In addition, a mode is also conceivable in which the design support device 30 is mounted to the digital instrument 1 that is a GUI design object and a professional user designs a GUI. Furthermore, a mode is also conceivable in which a general user having purchased the digital instrument 1 designs a GUI according to personal preference.

While it is assumed that the present invention encompasses all of these modes, hereinafter, an example will be described in which the design support device 30 is mounted to the digital instrument 1 and a general user or a professional user designs a GUI.

The digital instrument 1 shown in FIG. 1 comprises an input device 10, a display device 20, and the design support device 30. The design support device 30 comprises an input processing unit 31, a drawing processing unit 32, an attribute information managing unit 33, an attribute information storing unit 34, a GUI performance managing unit 35, a GUI performance information storing unit 36, a redrawing area displaying unit 37, a display updating unit 38, and a target redrawing area displaying unit 39.

The input device 10 is constituted by an input device such as a keyboard, a mouse, a remote controller, a touch panel, or the like and accepts various operation commands inputted by a user for operating GUI components that constitute a GUI displayed on a screen of the display device 20, various operation commands inputted by the user for designing a GUI, and the like.

Specifically, when an operation command is accepted from the user, the input device 10 notifies an input event indicating a type of the accepted operation command to the input processing unit 31. In this case, for example, conceivable input events include an input event indicating that a button of a keyboard or a remote controller has been pressed and an input event indicating that a mouse pointer has been moved to given coordinates.

When the input processing unit 31 receives an input event indicating that a button for starting an animation display of a GUI has been pressed from the input device 10, the input processing unit 31 notifies a drawing start instruction A1 for starting a drawing process of the GUI to the drawing processing unit 32.

When the drawing start instruction A1 is notified from the input processing unit 31, the drawing processing unit 32 acquires attribute information TB in each frame from the attribute information managing unit 33, and according to the acquired attribute information TB, displays the GUI as an animation by redrawing a difference image of successive frames in a time series. Specifically, when the drawing start instruction A1 is notified, the drawing processing unit 32 notifies an attribute information acquisition request A2 to the attribute information managing unit 33 and acquires attribute information TB. Thereafter, every time a frame period elapses, the drawing processing unit 32 notifies the attribute information acquisition request A2 to the attribute information managing unit 33 and acquires attribute information TB, obtains a difference image based on the acquired attribute information TB, and redraws the difference image. Moreover, in the present embodiment, the drawing processing unit 32 causes the display device 20 to display a GUI by notifying a draw command to the display updating unit 38.

FIGS. 2A and 2B are diagrams showing examples of a GUI drawn by the design support device 30, wherein FIG. 2A shows an initial frame F(S) of an animation of the GUI displayed on the display device 20 and FIG. 2B shows a final frame F(E) of the animation displayed on the display device 20. Moreover, the GUI shown in FIG. 2 is a GUI displayed on the display device 20 when the user executes a slide show function in order to view photograph images using the digital instrument 1.

FIGS. 3A and 3B are diagrams showing examples of a data structure of attribute information stored in the attribute information storing unit 34, wherein FIG. 3A shows attribute information TB(S) in the initial frame F(S) of the GUI and FIG. 3B shows attribute information TB(E) in the final frame F(E) of the GUI.

Hereinafter, a relationship between operations of the GUI shown in FIG. 2 and the attribute information shown in FIG. 3 will be described. For the frames F(S) and F(E) shown in FIGS. 2A and 2B, positions of respective pixels are defined using an XY coordinate system having, for example, a top left corner of a screen 201 provided by the display device 20 as an origin, a rightward direction as a positive direction of an X axis, and a downward direction as a positive direction of a Y axis. Moreover, in the following example, for example, the screen 201 is assumed to have 1920 pixels arranged in the X axis direction and 1080 pixels arranged in the Y axis direction. In addition, a length in the X axis direction of the screen 201 is defined as a width and a length in the Y axis direction of the screen 201 is defined as a height.

Attribute information of the frame F(S) shown in FIG. 2A is defined by the attribute information TB(S) shown in FIG. 3A, and attribute information of the frame F(E) shown in FIG. 2B is defined by the attribute information TB(E) shown in FIG. 3B. In other words, the drawing processing unit 32 refers to the attribute information TB(S) when drawing the frame F(S) and refers to the attribute information TB(E) when drawing the frame F(E).

The attribute information TB(S) and TB(E) shown in FIGS. 3A and 3B have a data structure arranged in a two-dimensional table format and are information for defining display positions and the like of respective GUI components that comprise the frames F(S) and F(E).

The attribute information TB(S) and TB(E) comprise fields that respectively store a "component ID", a "stacking order", a "component type", a "display position", a "display size", and a "transparency". "Component ID" is identification information for identifying a GUI component and is constituted by a numerical value uniquely assigned to each GUI component.

"Stacking order" is information used when GUI components are stacked on top of each other to indicate which GUI component is preferentially displayed. In the present embodiment, "stacking order" is defined so that the greater the numerical value, the more forward (toward the user) is the display in the screen 201. Moreover, it is defined that display positions of GUI components with the same "stacking order" value do not overlap each other.

"Component type" is information indicating a GUI component type classified according to display modes and generated events of GUI components, and includes a button, a character, an image, a text, and the like.

"Display position" indicates a display position of a GUI component on the screen 201. In the example shown in FIG. 3, two-dimensional coordinate data made up of a value on the X axis and a value on the Y axis is adopted. Moreover, in the example shown in FIG. 3, a display position of a rectangular GUI component is defined as a top left position of the GUI component. In addition, a display position of a circular or elliptical GUI component shown in FIG. 3 is defined as a center position of the GUI component.

"Display size" is information indicating a size of a GUI component and in the example shown in FIG. 3, a size is defined by a width (w) and a height (h). Moreover, since all of the GUI components shown in FIG. 3 are rectangular, sizes can be defined using widths and heights. However, when adopting a circular GUI component, a size thereof is defined by a radius, and when adopting an elliptical GUI component, a size thereof is defined by a minor axis and a major axis.

"Transparency" is a numerical value indicating whether or not a GUI component is semi-transparently drawn. In the present embodiment, a transparency of 1 is defined as being non-transparent, and a transparency of 0 is defined as being transparent. When the transparency is 0, none of a GUI component is drawn and the GUI component is not displayed on a screen. In addition, a transparency expressed as 0<transparency<1 is defined as being semi-transparent. A GUI component with a "transparency" that is semi-transparent is drawn so that a background image can be seen through the GUI component. In addition, a GUI component with a "transparency" that is semi-transparent is drawn so that when a GUI component with a "stacking order" of a smaller numerical value is arranged overlapped on a background side, the GUI component with the smaller "stacking order" can be seen through the semi-transparent GUI component.

Moreover, for example, alpha blending may be adopted as a method of drawing a semi-transparent GUI component. In alpha blending, a GUI component is drawn by combining R, G, and B brightness values of the GUI component with R, G, and B brightness values of a GUI component arranged on a background-side of the GUI component or a background image in a proportion indicated by the "transparency".

In the attribute information TB(S) shown in FIG. 3A, six GUI components whose "component IDs" range from "3202" to "3207" are defined. The GUI component whose "component ID" is "3202" corresponds to a button B1 shown in FIG. 2A. The three GUI components whose "component IDs" are "3205" to "3207" correspond to images G1 to G3 shown in FIG. 2A. Moreover, in the attribute information TB(S), since a button GUI component whose "component ID" is "3203" and a character GUI component whose "component ID" is "3204" both have a "transparency" of 0.0, the GUI components are not displayed in FIG. 2A.

In the attribute information TB(E) shown in FIG. 3B, the same six GUI components shown in FIG. 3A are similarly defined. However, in the attribute information TB(E), the "transparency" of the GUI component whose "component ID" is "3202" has changed to 0.0 and the "transparency" of the GUI component whose "component ID" is "3203" has changed to 1.0. Therefore, in FIG. 2B, the button B1 displayed in FIG. 2A is not displayed and the button B2 is displayed instead.

In addition, in the attribute information TB(E), the "transparency" of the GUI component whose "component ID" is "3204" has changed to 1.0. Therefore, a GUI component of a character TX not displayed in FIG. 2A is now displayed in FIG. 2B.

Moreover, the button B1 shown in FIG. 2A is a "playback" button. When the button B1 is operated by the user, a drawing start instruction A1 is outputted and an animation display of a GUI is started. In the example shown in FIGS. 2A and 2B, an animation is adopted in which an image G3 shown in FIG. 2A is displayed gradually enlarged until reaching a size of the image G3 shown in FIG. 2B.

Moreover, a GUI component is defined by the attribute information TB(S) and TB(E) described above and in a format (for example, a program) in which enables an event created when the GUI component is operated by a user to be executed on the digital instrument 1.

Returning now to FIG. 1, the attribute information managing unit 33 manages the attribute information TB stored in the attribute information storing unit 34. Specifically, each time an attribute information acquisition request A2 is notified from the drawing processing unit 32, the attribute information managing unit 33 executes a predetermined interpolation process on the attribute information TB stored in the attribute information storing unit 34, calculates attribute information TB(i) in an ith (where i denotes an index defining a frame number) frame, and hands over the calculated attribute information TB(i) to the drawing processing unit 32.

In the present embodiment, the attribute information storing unit 34 stores initial attribute information TB(S) and final attribute information TB(E) of a GUI. Therefore, the attribute information managing unit 33 calculates the attribute information TB(i) by interpolating the attribute information TB(S) and TB(E) using an elapsed time $\Delta T$ from a start of animation and a predetermined display time TT from the start to finish of the animation. In this case, any type of interpolation process may be adopted as long as the attribute information approximates the attribute information TB(E) as the elapsed time $\Delta T$ increases and becomes the attribute information TB(E) upon the lapse of the display time TT. For example, linear interpolation or Bezier interpolation may be adopted.

Specifically, when the attribute information acquisition request A2 for displaying the initial frame is notified from the drawing processing unit 32, the attribute information managing unit 33 hands over the attribute information TB(S) to the drawing processing unit 32. Accordingly, the frame F(S) shown in FIG. 2A is drawn.

Next, when the button B1 is operated and the drawing start instruction A1 is notified, the drawing processing unit 32 starts measuring the elapsed time $\Delta T$ and, at the same time, hands over the attribute information acquisition request A2 to the attribute information managing unit 33.

Next, the attribute information managing unit 33 receives the attribute information acquisition request A2, compares the attribute information TB(S) with the attribute information TB(E), and identifies a GUI component whose "display position" or "display size" has changed as an animation object GUI component. In the example shown in FIGS. 3A and 3B, the GUI component (the image G3) whose "component ID" is "3207" has a changed "display position" and a changed "display size" and is therefore identified as an animation object GUI component.

Subsequently, the attribute information managing unit 33 obtains an interpolated display position and an interpolated display size of the image G3 by respectively multiplying a difference in display positions and a difference in display sizes between the attribute information TB(S) and TB(E) by $\Delta T/TT$. The attribute information managing unit 33 then stores the obtained interpolated display position and interpolated display size in "display position" and "display size" fields of a record of the attribute information TB(i) whose "component ID" is "3207", and hands over the obtained interpolated display position and interpolated display size to the drawing processing unit 32. Subsequently, each time the attribute information acquisition request A2 is notified, the attribute information managing unit 33 executes the process described above to obtain an interpolated display position and an interpolated display size, stores the obtained interpolated display position and interpolated display size in the attribute information TB(i), and hands over the same to the drawing processing unit 32. According to the above, an animation of the image G3 is displayed so that the image G3 changes smoothly from the "display position" and the "display size" defined by the attribute information TB(S) toward the "display position" and the "display size" defined by the attribute information TB(E).

Returning now to FIG. 1, the attribute information storing unit 34 comprises, for example, a rewritable non-volatile storage device and stores the attribute information TB(S) and TB(E) in advance.

The GUI performance managing unit 35 generates a GUI performance management table TBS in which a drawing processing time TS in each frame measured by the target redrawing area displaying unit 39 is stored in association with attribute information TB of each frame, stores the generated GUI performance management table TBS in the GUI performance information storing unit 36, and manages the GUI performance management table TBS.

Figure 4:
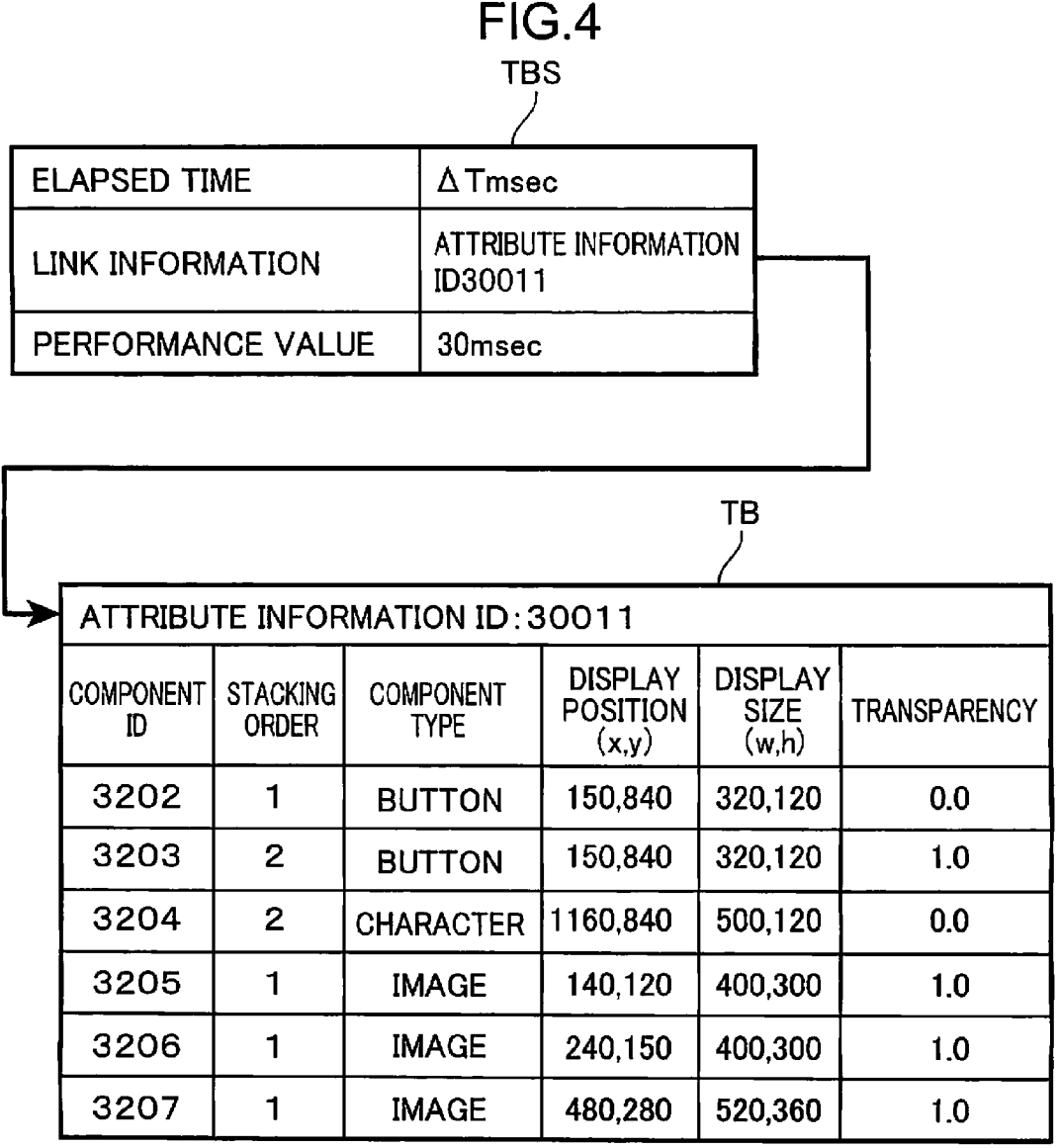
FIG. 4 is a diagram showing an example of a data structure of a GUI performance management table.

FIG. 4 is a diagram showing an example of a data structure of the GUI performance management table TBS. The GUI performance management table TBS shown in FIG. 4 includes fields in which an "elapsed time", "link information", and a "value in performance" are respectively stored.

"Elapsed time" indicates an elapsed time $\Delta T$ (msec) from the start of an animation display. "Link information" indicates an attribute information ID for identifying attribute information that had been used when drawing a frame of the elapsed time $\Delta T$ stored in the "elapsed time" field. In the example shown in FIG. 4, since the "attribute information ID" is 30011, a drawing processing time TS stored in the "value in performance" field is associated with the attribute information TB to which 30011 has been assigned as the attribute information ID.

"Value in performance" indicates the drawing processing time TS measured by the target redrawing area displaying unit 39 of a frame drawn when the elapsed time $\Delta T$ has lapsed. In the example shown in FIG. 4, the "value in performance" of 30 msec shows that drawing of the frame at the elapsed time $\Delta T$ required 30 msec.

Moreover, when a storage request A3 for the drawing processing time TS is notified from the target redrawing area displaying unit 39, the GUI performance managing unit 35 acquires the attribute information TB corresponding to the drawing processing time TS from the attribute information managing unit 33, and generates the GUI performance management table TBS by assigning an attribute information ID to the acquired attribute information TB.

In this case, a numerical value uniquely assigned to each piece of attribute information TB is adopted as the attribute information ID, and the longer the elapsed time $\Delta T$, the greater the assigned numerical value.

Moreover, the storage request A3 is notified from the target redrawing area displaying unit 39 each time the drawing processing time TS is measured, and the GUI performance managing unit 35 updates the GUI performance management table TBS each time the storage request A3 is notified. Therefore, the GUI performance management table TBS shown in FIG. 4 is generated in a number corresponding to the number of frames drawn from the start to finish of an animation. Accordingly, a GUI performance management table TBS is generated which stores information to which an elapsed time $\Delta T$, a drawing processing time TS, and attribute information TB are associated in a time series. As a result, the user is able to collate a drawing processing time and attribute information of each frame afterwards, and is therefore provided with useful information when identifying improvements that should be made on a GUI.

Figure 5:
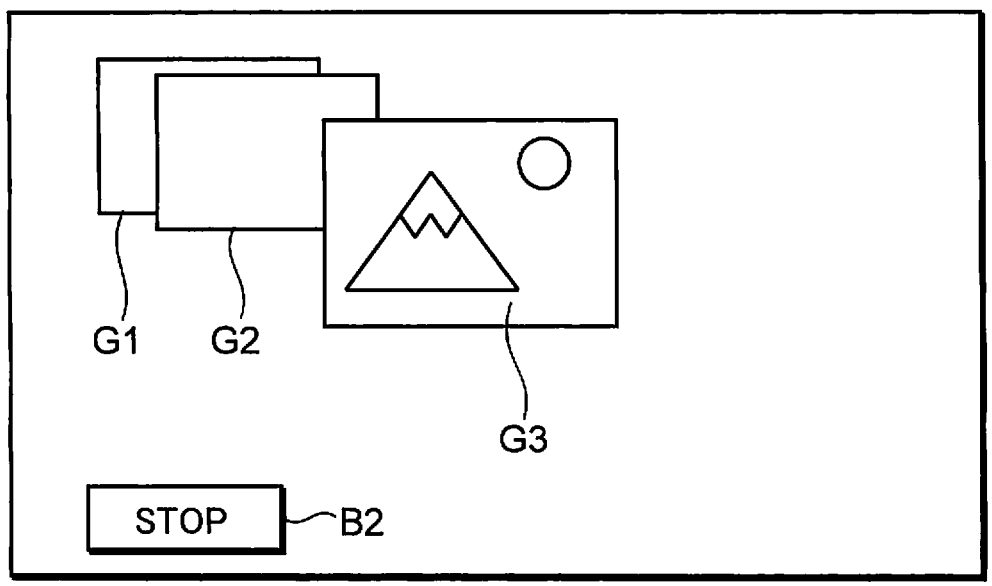
FIG. 5 shows a frame drawn according to the attribute information shown in FIG. 4.

FIG. 5 shows a frame drawn according to the attribute information TB shown in FIG. 4. In the attribute information TB shown in FIG. 4, the GUI component (image G3) whose component ID is 3207 has a "display position" of "480, 280" and a "display size" of "520, 360". In other words, an interpolated display position of the image G3 is calculated as "480, 280" and an interpolated display size of the image G3 is calculated as "520, 360". Therefore, the image G3 shown in FIG. 5 is displayed so as to have a top left position at coordinates "480, 280", a width of 520, and a height of 360.

Moreover, in FIG. 5, a button B2 that is a "stop" button is displayed. This is because a program has been created in advance in order to display the "stop" button in place of the "playback" button once the animation is started, and according to the program, the attribute information managing unit 33 has generated the attribute information TB shown in FIG. 4 by changing the transparency of the button B1 that had been 1.0 in the attribute information TB(S) to 0.0 and changing a transparency of the button B2 that had been 0.0 in the attribute information TB(S) to 1.0.

Figure 6A:
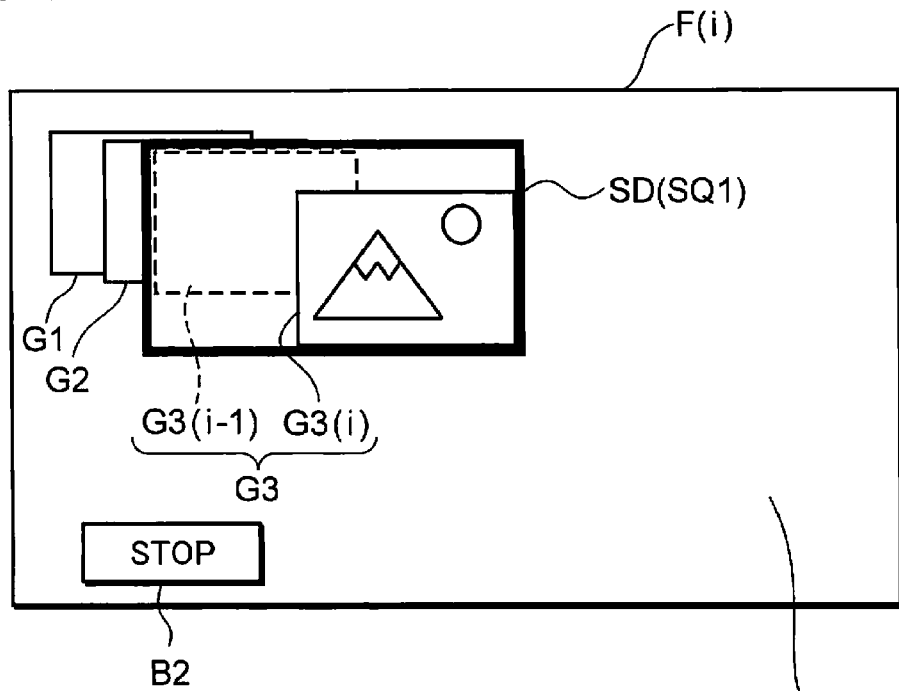
FIG. 6A is a diagram showing an example of a redrawing area.

Returning now to FIG. 1, the redrawing area displaying unit 37 sets a redrawing area SD based on an area redrawn by the drawing processing unit 32 in each frame, and displays an image representing the set redrawing area SD by overlapping the image on the GUI. FIG. 6A is a diagram showing an example of the redrawing area SD. In FIG. 6A, an image G3(i) represents the image G3 drawn in an ith frame F(i) that is a current frame, and an image G3(i−1) represents the image G3 drawn in a frame F(i−1) immediately preceding to the ith frame F(i).

In the example shown in FIG. 6A, an animation is adopted in which the image G3 is moved diagonally right-downward and is displayed enlarged with time in the screen 201. In this case, the drawing processing unit 32 must draw the image G3(i) and, at the same time, due to the movement of the image G3(i−1), also draw a newly displayed background (colors, images, and the like) and a part of the image G2.

In other words, while an erasing process of the image G3(i−1) occurs when moving the image G3(i−1) to display the image G3(i), at this point, a part of the image G2 that is exposed due to the image G3(i−1) being erased and a part of the background (colors and images) other than the image G2 that is exposed due to the image G3(i−1) being erased must be drawn.

Therefore, the redrawing area displaying unit 37 sets a circumscribed rectangle that is a graphic that circumscribes the image G3(i) and the image G3(i−1) as the redrawing area SD in frame F(i).

Moreover, processes that may be adopted as a drawing process of the redrawing area SD include a process involving minimal drawing such as "the image G3(i)+a part of the image G2+a part of the background" and a process involving first erasing the images G2 and G3(i−1) in the redrawing area SD and subsequently drawing the image G3(i) and a part of the image G2.

In addition, the redrawing area displaying unit 37 overlaps and displays an image highlighting an outline of the set redrawing area SD on the frame F(i). In the example shown in FIG. 6A, a rectangular image SQ1 which represents an outline of the redrawing area SD is adopted as an image representing the redrawing area SD. Moreover, the redrawing area displaying unit 37 may overlap and display the rectangular image SQ1 on each frame of the GUI or overlap and display the rectangular image SQ1 only on an excess frame which will be described later.

The redrawing area displaying unit 37 overlaps and displays the redrawing area SD on each frame or on an excess frame by notifying a draw command for overlapping and displaying the rectangular image SQ1 representing the redrawing area SD to the display updating unit 38.

Returning now to FIG. 1, each time a frame of the GUI is updated by the drawing processing unit 32, the target redrawing area displaying unit 39 measures the drawing processing time TS of the updated frame, and when the measured drawing processing time TS exceeds a predetermined reference processing time TR, calculates a target redrawing area MD that is drawable within the reference processing time TR, and overlaps and displays an image representing the calculated target redrawing area MD on an excess frame that is a frame in which the measured drawing processing time TS exceeds the predetermined reference processing time TR. In this case, as the reference processing time TR, for example, a predetermined time in which a GUI can be smoothly displayed as an animation may be adopted based on a drawing processing performance of hardware that executes the GUI.

In addition, each time the target redrawing area displaying unit 39 calculates the drawing processing time TS, the target redrawing area displaying unit 39 notifies a save request A3 for storing the drawing processing time TS in the GUI performance management table TBS to the GUI performance managing unit 35. Hereinafter, a description will be given assuming that the frame F(i) is an excess frame.

Figure 6B:
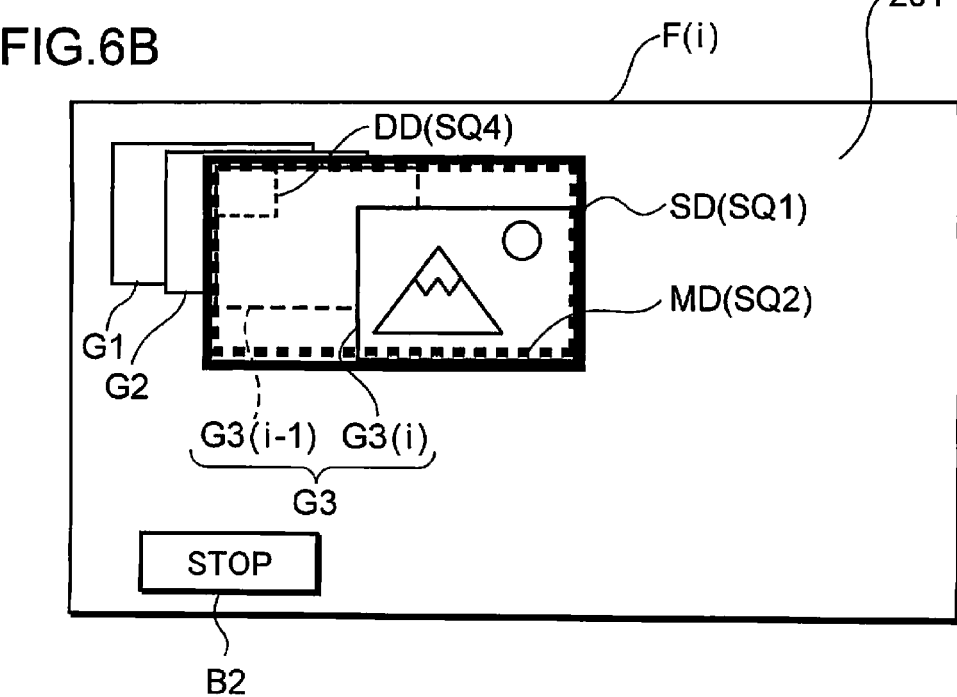
FIG. 6B is a diagram showing a frame displaying a target redrawing area.

FIG. 6B is a diagram showing a frame displaying the target redrawing area MD. An area enclosed by the dotted line in FIG. 6B is the target redrawing area MD. In this case, the target redrawing area MD can be approximately defined by the following expression (1).

$$\text{Target redrawing area } MD \times \text{constant } \beta = \text{reference processing time } TR \quad (1)$$

In the above expression, the constant $\beta$ may be expressed by expression (2).

$$\text{Constant } \beta = 1/\text{draw processing area per unit time} \quad (2)$$

Moreover, for the drawing processing area per unit time indicated in expression (2), a value given in advance as the number of pixels drawable by the drawing processing unit 32 per unit time (for example, in one second) is adopted.

Subsequently, the target redrawing area displaying unit 39 assumes that the target redrawing area MD obtained by expression (1) is similar to the redrawing area SD and calculates a width MD_w and a height MD_h of the target redrawing area MD.

The target redrawing area displaying unit 39 then overlaps an image that highlights an outline of the target redrawing area MD having the width MD_w and the height MD_h on the frame F(i). In the example shown in FIG. 6B, a rectangular image SQ2 which represents an outline of the target redrawing area MD by a dotted line is adopted as an image representing the target redrawing area MD. In this case, the target redrawing area displaying unit 39 sets the target redrawing area MD on the frame F(i) so that a top left vertex of the target redrawing area MD is positioned at a top left vertex of the redrawing area SD. However, this is merely an example and the target redrawing area displaying unit 39 may set the target redrawing area MD on the frame F(i) so that a center of the target redrawing area MD is positioned at a center of the redrawing area SD or may set the target redrawing area MD so that a bottom left vertex, a top right vertex, or a bottom right vertex of the target redrawing area MD is positioned at a bottom left vertex, a top right vertex, or a bottom right vertex of the redrawing area SD.

As described above, since the target redrawing area MD is displayed in the frame F(i), the user can readily recognize by how much the redrawing area SD should be reduced to bring the drawing processing time TS of the frame F(i) equal to or less than the reference processing time TR. Consequently, even a user without expert knowledge regarding hardware and software that execute a GUI can promptly recognize improvements that should be made on a GUI and readily design a GUI that can be smoothly displayed as an animation.

In addition, when the drawing processing time TS exceeds the reference processing time TR, the target redrawing area displaying unit 39 stops the drawing process of frames F(i+1), F(i+2), . . . , subsequent to the excess frame F(i) by the drawing processing unit 32.

Accordingly, in the event that an excess frame F(i) is detected when the GUI is displayed as an animation, the animation is stopped in a state in which the excess frame F(i) is displayed on the screen 201. Therefore, the user can readily recognize which frame is an excess frame F(i). In addition, since the excess frame F(i) is displayed in a stopped state and rectangular images SQ1 and SQ2 are displayed on the excess frame F(i), the user can readily recognize by how much the redrawing area SD should be reduced when re-designing the excess frame F(i).

Furthermore, when the drawing processing time TS exceeds the reference processing time TR, the target redrawing area displaying unit 39 judges whether or not a redrawing area SD(i) in the excess frame F(i) has been enlarged from a redrawing area SD(i−1) in the excess frame F(i−1). In addition, when the target redrawing area displaying unit 39 judges that the redrawing area SD(i) has been enlarged, the target redrawing area displaying unit 39 extracts a GUI component that had been an enlarging factor of the redrawing area SD(i) and highlights the extracted GUI component in the excess frame F(i).

Consequently, the user can readily recognize which GUI component needs to be subjected to a display mode change in order to reduce the redrawing area SD(i) when re-designing the excess frame.

Figure 8:
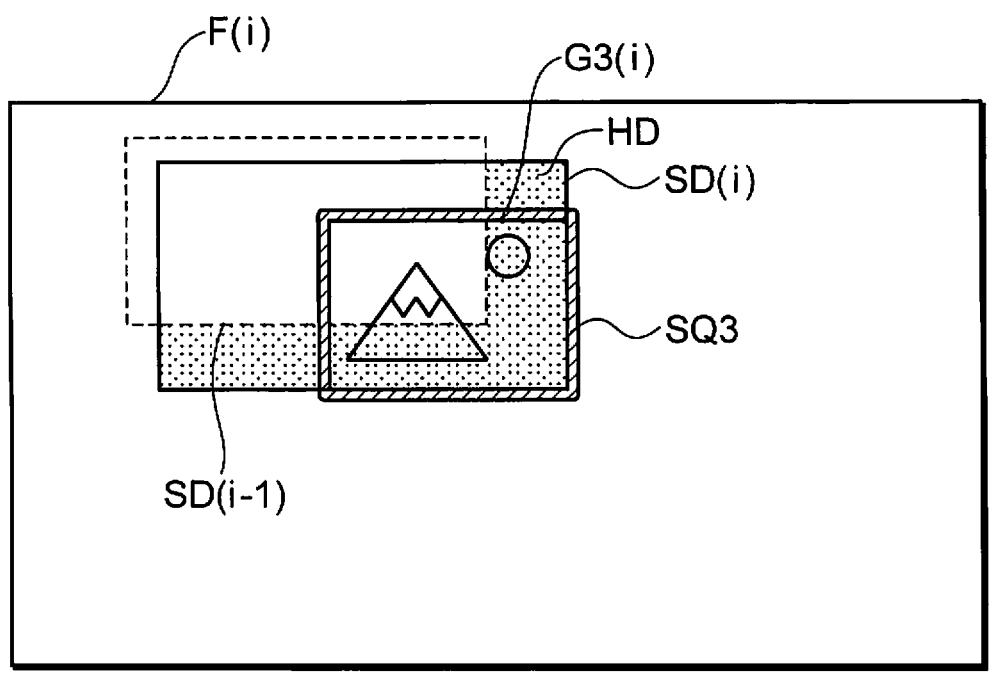
FIG. 8 shows a GUI component highlighted because the GUI component had been an enlarging factor of a redrawing area.

FIG. 8 shows a GUI component highlighted because the GUI component had been an enlarging factor of the redrawing area SD. As shown in FIG. 8, the target redrawing area displaying unit 39 compares the redrawing area SD(i−1) in the frame F(i−1) with the redrawing area SD(i). When a surface area of the redrawing area SD(i) is greater than a surface area of the redrawing area SD(i−1), the target redrawing area displaying unit 39 judges that the redrawing area SD(i) has been enlarged.

Subsequently, the target redrawing area displaying unit 39 extracts an area HD protruding from the redrawing area SD(i−1) in the redrawing area SD(i). In the example shown in FIG. 8, a meshed L-shaped area is extracted as the area HD.

The target redrawing area displaying unit 39 then extracts a GUI component which is drawn within the area HD and which has at least a part of an outline inscribed in the redrawing area SD(i) as the GUI component that had been an enlarging factor of the redrawing area SD(i). In the example shown in FIG. 8, an image G3(*i*) is extracted as the GUI component that had been an enlarging factor.

Subsequently, the target redrawing area displaying unit 39 overlaps and displays an image that highlights the outline of the image G3(*i*) which is the GUI component that had been the enlarging factor on the frame F(i). In the example shown in FIG. 8, a rectangular image SQ3 representing the outline of the image G3(*i*) by a bold line is adopted as the highlighted image.

Moreover, since displaying the rectangular images SQ1 and SQ2 shown in FIG. 6B and the rectangular image SQ3 shown in FIG. 8 at the same time may become confusing, the rectangular images SQ1 to SQ3 are favorably displayed in colors that differ from each other.

Furthermore, when the drawing processing time TS exceeds the reference processing time TR, the target redrawing area displaying unit 39 may alternatively compare attribute information TB(i) corresponding to the excess frame F(i) with attribute information TB(i−1) corresponding to the frame F(i−1) immediately preceding the excess frame F(i), extract a GUI component whose transparency had changed from non-transparent to semi-transparent, and highlight the extracted GUI component in the excess frame F(i).

Let us assume that the transparency of the button B2 shown in FIG. 2B has changed from 1.0 to 0.5 from the frame F(i−1) to the excess frame F(i).

In this case, the target redrawing area displaying unit 39 highlights the button B2 in the excess frame F(i). In doing so, the target redrawing area displaying unit 39 may highlight the button B2 by enclosing the outline of the button B2 by a bold line, by displaying the button B2 in a color that differs from a normal color, or the like.

When changing a GUI component from non-transparent to semi-transparent, there is a risk of significantly increasing drawing processing time TS due to reasons such as having to execute image processing on a background image of the GUI component or on image data of a GUI component behind the GUI component. Therefore, in the present embodiment, when a GUI component that has changed from non-transparent to semi-transparent exists in the excess frame F(i), the GUI component is highlighted. Consequently, the user can readily recognize which GUI component needs to be subjected to a display mode change when performing a design change of a GUI in order to keep the drawing processing time TS under the reference processing time TR.

Alternatively, when the drawing processing time TS exceeds the reference processing time TR, the target redrawing area displaying unit 39 may compare attribute information TB(i) corresponding to the excess frame F(i) with attribute information TB(i−1) corresponding to the frame F(i−1), extract a GUI component newly drawn in the excess frame F(i), and highlight the extracted GUI component in the excess frame.

For example, if it is described in the attribute information TB(i) that a new button GUI component is to be additionally displayed when a transition is made from the frame F(i−1) to the excess frame F(i), the target redrawing area displaying unit 39 arranges this button to be highlighted in the excess frame F(i). As modes for highlighting the button, modes such as enclosing the outline of the button by a bold line or displaying the button in a color that differs from a normal color may be adopted. In this case, the target redrawing area displaying unit 39 may judge whether or not a new GUI component has been added by focusing on the "component ID" included in the attribute information TB.

Moreover, when the drawing processing time TS exceeds the reference processing time TR, the target redrawing area displaying unit 39 calculates a target deletion area DD indicating a size of a drawing area that must be reduced based on a difference between the drawing processing time TS and the reference processing time TR. In this case, the target deletion area is defined by expression (3).

$$\text{Target deletion area } DD = (\text{drawing processing time } TS - \text{reference processing time } TR) \times (1/\text{constant } \beta) \quad (3)$$

In the above expression, 1/constant β=drawing surface area per unit time.

In this case, the drawing processing time TS may be expressed by expression (4).

$$\text{Drawing processing time } TS = \text{summation } SB \text{ of drawing areas of respective redrawn GUI components} \times \text{constant } \beta \quad (4)$$

Let us assume that a different GUI component has been newly added in an area other than the image G3(i) within the redrawing area SD shown in FIG. 6A. In this case, the summation SB of drawing areas of respective GUI components included in expression (4) may be expressed as image G3(i)+ surface area of new GUI component.

Moreover, as the drawing processing time TS, a drawing processing time TS measured by the target redrawing area displaying unit 39 may be adopted in place of the drawing processing time TS calculated using expression (4).

As a display mode of the target deletion area DD, for example, while a rectangular image SQ4 in which an outline of the target deletion area DD is depicted by a bold line may be adopted as shown in FIG. 6B, the rectangular image SQ4 is favorably displayed in a color that differs from the rectangular images SQ1 to SQ3 in order to differentiate the target deletion area DD from the target redrawing area MD and the like.

Furthermore, in a similar manner to the rectangular image SQ2, the rectangular image SQ4 may be displayed so as to be positioned at a top left vertex, a top right vertex, a bottom left vertex, or a bottom right vertex of the redrawing area SD or may be displayed so as to be positioned at a center of the redrawing area SD.

By displaying the target deletion area DD in this manner, the user can prevent the redrawing area SD from being excessively reduced when re-designing the GUI.

Moreover, the target redrawing area displaying unit 39 overlaps and displays the rectangular images SQ2 to SQ4 on the excess frame F(i) by outputting a draw request for drawing the rectangular images SQ2 to SQ4 to the redrawing area displaying unit 37. When a draw request for the rectangular images SQ2 to SQ4 is outputted from the target redrawing area displaying unit 39, the redrawing area displaying unit 37 notifies a draw command in accordance with the draw request to the display updating unit 38 and causes the rectangular images SQ2 to SQ4 to be drawn.

Returning now to FIG. 1, the display updating unit 38 comprises a drawing buffer. By sequentially writing image data of frames constituting a GUI at a predetermined frame rate into the drawing buffer according to the draw command from the drawing processing unit 32, the display updating unit 38 causes the display device 20 to display the GUI.

In addition, the display updating unit 38 overlaps and displays the rectangular image SQ1 by writing the rectangular image SQ1 into the drawing buffer into which respective frames or an excess frame has been written according to the draw command from the redrawing area displaying unit 37. Furthermore, the display updating unit 38 overlaps and displays the rectangular images SQ2 to SQ4 on the excess frame by writing the rectangular images SQ2 to SQ4 into the drawing buffer into which the excess frame has been written according to the draw command from the redrawing area displaying unit 37.

The display device 20 comprises a display device such as a liquid crystal panel or a plasma panel, and displays image data written into the drawing buffer by the display updating unit 38 on the screen 201.

Heretofore, a configuration of the design support device 30 according to an embodiment of the present invention has been described. Next, processes performed by the design support device 30 according to the embodiment of the present invention will be described. FIG. 7 is a flow chart showing processes performed by the design support device 30 according to the embodiment of the present invention.

In this flow chart, an example of an animation in which the image G3 is displayed enlarged at a predetermined frame rate from the frame F(S) to the frame F(E) shown in FIG. 2A will be described.

First, a user uses the input device 10 to perform an input operation on the button B1 shown in FIG. 2 (YES in step S1). Consequently, the input processing unit 31 receives the input event and outputs a drawing start instruction A1 to the drawing processing unit 32. Accordingly, processes of step S2 and thereafter are started. On the other hand, when an input operation is not performed on the button B1 (NO in step S1), the process is returned to step S1 and processes of step S2 and thereafter are not started.

Next, when a start time of a drawing process of the frame F(i) has arrived (YES in step S2), the drawing processing unit 32 notifies the target redrawing area displaying unit 39 that a drawing process of the frame F(i) is to be started. The target redrawing area displaying unit 39 having received this notification starts measuring a drawing processing time TS (step S3).

In the present embodiment, the drawing processing unit 32 sequentially draws respective frames of a GUI at a predetermined frame period. Therefore, the drawing processing unit 32 makes a judgment of YES in step S2 when the frame period has elapsed from a start time of a drawing process of a frame F(i−1) and a drawing timing of the frame F(i) has arrived.

Next, the drawing processing unit 32 notifies an attribute information acquisition request A2 regarding the frame F(i) to the attribute information managing unit 33 and acquires attribute information TB(i) corresponding to the frame F(i) (step S4), identifies a difference image from the attribute information TB(i) and attribute information TB(i−1), and draws the frame F(i) by outputting a draw command for drawing the difference image to the display updating unit 38. In this case, the attribute information TB(i) is calculated by executing the interpolation process described above on attribute information TB(S) and attribute information TB(E).

Once drawing of the frame F(i) is finished, the drawing processing unit 32 outputs a drawing process completion notification to the target redrawing area displaying unit 39, and the target redrawing area displaying unit 39 having received the notification finishes the measurement of the drawing processing time TS (step S5).

Next, the target redrawing area displaying unit 39 notifies a save request A3 to the GUI performance managing unit 35, and as shown in FIG. 4, the GUI performance managing unit 35 associates the measured drawing processing time TS of the frame F(i) and the attribute information TB(i) corresponding to the frame F(i) with each other and adds the same to the GUI performance management table TBS, and saves the drawing processing time TS (step S6).

The redrawing area displaying unit 37 then sets a redrawing area SD based on the difference image redrawn by the drawing processing unit 32, and by outputting a draw command for drawing a rectangular image SQ1 representing the redrawing area SD to the display updating unit 38, overlaps and displays the rectangular image SQ1 on the frame F(i) (step S7). Consequently, the rectangular image SQ1 as shown in FIG. 6A is displayed on the screen 201.

Next, the target redrawing area displaying unit 39 judges whether or not the drawing processing time TS of the frame F(i) is longer than a reference processing time TR, and when the drawing processing time TS is longer than the reference processing time TR (YES in step S8), outputs a stop instruction of drawing processes of a frame F(i+1) and thereafter to the drawing processing unit 32.

On the other hand, when the drawing processing time TS is equal to or shorter than the reference processing time TR (NO in step S8), the process is returned to step S2 and a drawing process of a next frame is performed.

Next, the drawing processing unit 32 receives a stop instruction of drawing processes from the target redrawing area displaying unit 39 and stops the drawing processes of the frame F(i+1) and thereafter (step S9).

Subsequently, the target redrawing area displaying unit 39 calculates a target redrawing area MD using expression (1), calculates a target deletion area DD using expression (3), and overlaps and displays the rectangular images SQ2 and SQ4 shown in FIG. 6B and the rectangular image SQ3 shown in FIG. 8 on the frame F(i) (step S10).

As described above, according to the design support device 30, when the drawing processing time TS is longer than the reference processing time TR, the animation is stopped and the rectangular image SQ2 representing the target redrawing area MD is displayed overlapped on an excess frame. In other words, the target redrawing area MD indicating a size of an area that satisfies the reference processing time TR is visualized and displayed.

Therefore, even a user without expert knowledge regarding factors that determine the drawing processing time TS such as a GUI designer is able to reference the target redrawing area MD in order to redesign the GUI so that the drawing processing time TS satisfies the reference processing time TR.

In addition, according to the design support device 30, the target deletion area DD indicating a size of an area that should be reduced for the drawing processing time TS to satisfy the reference processing time TR is visualized and displayed. Therefore, by using the target deletion area DD as a benchmark, the user is able to recognize how much a surface area of each of the GUI components should be reduced and prevent re-designing in which GUI components are excessively reduced.

Moreover, while the target redrawing area displaying unit 39 extracts a newly drawn GUI component by focusing on the "component ID" in an excess frame in the description given above, this arrangement is not restrictive. Alternatively, the target redrawing area displaying unit 39 may extract a GUI component whose "transparency" has changed from transparent (transparency=0.0) to semi-transparent (0<transparency<1) or non-transparent (transparency=1.0) as a newly drawn GUI component.

In addition, when GUI components that had been increasing factors of the drawing processing time TS exist in plurality in an excess frame, favorably, the target redrawing area displaying unit 39 sets colors of rectangular images representing outlines of the GUI components to colors that are different from each other, sets type of meshing so as to differ from each other, or sets line types that indicate outlines so as to differ from each other.

Furthermore, when a GUI component extracted due to factor 1 (contributed in enlarging the redrawing area SD), a GUI component extracted due to factor 2 (transparency has changed from non-transparent (transparency=1.0) to semi-transparent (0<transparency<1)), and a GUI component extracted due to factor 3 (newly added) coexist in an excess frame, the GUI components are favorably displayed by classifying the GUI components according to factors. As a method of displaying the GUI components by classifying the GUI components according to factors, the method described above in the case in which a plurality of GUI components exist may be used.

Consequently, the user can immediately understand a cause of the drawing processing time TS exceeding the reference processing time TR.

In addition, when a single GUI component extracted in an excess frame is a GUI component extracted due to a plurality of factors among the factors 1 to 3, the target redrawing area displaying unit 39 favorably highlights the GUI component in a display mode that informs of all of the plurality of factors.

For example, in FIG. 8, while the image G3(i) falls under the factor 1 and is therefore highlighted, if the transparency of the image G3(i) changes from non-transparent to semi-transparent at the same time, the image G3(i) also falls under the factor 2. In this case, the image G3(i) is favorably highlighted so as to inform that the image G3(i) falls under the factor 2 as well as the factor 1.

For example, for a GUI component that falls under only one factor, an outline of the GUI component may be highlighted, and a GUI component that falls under two factors may be highlighted by meshing.

Furthermore, when a single GUI component extracted in an excess frame falls under a plurality of factors, the target redrawing area displaying unit 39 may alternatively highlight the GUI component and, at the same time, display a speech bubble-type graphic in a vicinity of the GUI component and display a text indicating a factor in the speech bubble-type graphic. For example, when the image G3(i−1) shown in FIG. 6A is enlarged to the image G3(i) and the transparency of the image G3(i−1) is changed from non-transparent to semi-transparent, the image G3 has contributed to two factors, namely, the factors 1 and 2.

In this case, as a text indicating a factor, a speech bubble-type graphic may be displayed in a vicinity of the image G3(i−1) and a text indicating the factors 1 and 2 such as "width/height has increased" or "became semi-transparent" may be displayed in the graphic.

Moreover, when a plurality of GUI components is judged to fall under any of the factors 1 to 3 and is extracted in an excess frame, the target redrawing area displaying unit 39 may calculate a drawing processing time of each GUI component for each of the factors 1 to 3 and may highlight a predetermined number of GUI components starting from a GUI component with a longest drawing processing time.

A drawing processing time TS(k) of each GUI component can be expressed by expression (5).

$$\text{Drawing processing time } TS(k) = \text{surface area } S(k) \text{ of the GUI component}(k) \times \text{constant } \gamma \quad (5),$$

where surface area S(k)=height k_h×width k_w of the GUI component (k), and constant γ is a value determined in advance in accordance with the factors 1 to 3.

For example, let us assume that a button GUI component has been newly added in an area other than the redrawing areas SD(i) and SD(i−1) shown in FIG. 8. In this case, the button GUI component falls under the factor 3 and the image G3(i) falls under the factor 1. Therefore, if the button is denoted as k=1 and the image G3 is denoted as k=2, then calculations may be performed as drawing processing time TS(1)=surface area S(1) of the button×constant γ_3 and drawing processing time TS(2)=surface area S(2) of the image G3(i)×constant γ_1, where the constant γ_1 denotes the constant γ of the factor 1 and the constant γ_3 denotes the constant γ of the factor 3.

In addition, in the embodiment described above, while a case has been exemplified in which a single redrawing area SD exists in the frame F(i) as shown in FIG. 6A, the redrawing area SD may exist in plurality in the frame F(i). For example, when a GUI component of a button B3 is newly added in an area other than the redrawing area SD and the button B2 in FIG. 6A, an area in which the GUI component is drawn becomes the redrawing area SD.

In this case, if the redrawing area SD shown on an upper side of FIG. 6A is denoted as SD_1 and a redrawing area of the newly added button B3 is denoted as SD_2, when after the target redrawing area displaying unit 39 starts a measurement of the drawing processing time TS for the frame F(i), the target redrawing area displaying unit 39 may finish the measurement of the drawing processing time TS when drawing of the redrawing area SD of whichever has a later drawing finish time between the redrawing area SD_1 and the redrawing area SD_2 is finished, and may set the measured drawing processing time TS as the drawing processing time TS of the frame F(i).

Furthermore, the respective processes performed by the design support device 30 according to the embodiment of the present invention may be realized by having a CPU execute a design support program stored in a storage device (a ROM, a RAM, a hard disk, and the like).

In this case, the design support program may be installed in the storage device via a storage medium or may be directly executed from the storage medium.

As the storage medium, a ROM, a RAM, a semiconductor memory such as a flash memory, a magnetic disk memory such as a flexible disk and a hard disk, a CD-ROM, a DVD, an optical disk memory such as a BD, a memory card, or the like may be adopted. In addition, the storage medium is a concept that includes a communication medium such as a telephone line and a carrier channel. In other words, the design support device 30 may be realized by having a CPU execute a design support program stored in a WEB server.

Moreover, among the design support device 30 shown in the block diagram in FIG. 1, the seven blocks other than the attribute information storing unit 34 and the GUI performance information storing unit 36 are primarily realized by a CPU and the attribute information storing unit 34 and the GUI performance information storing unit 36 are primarily realized by a hard disk.

In addition, the respective blocks of the design support device 30 shown in FIG. 1 can each be realized as an LSI that is an integrated circuit. In this case, the respective blocks may be individually configured as single chips or a single chip may be configured which includes at least one or all of the blocks. The term LSI is to include an IC, a system LSI, a super LSI, and an ultra LSI.

When realizing the design support device 30 with an integrated circuit, among the design support device 30 shown in FIG. 1, components other than the attribute information storing unit 34 and the GUI performance information storing unit 36 may be realized as an integrated circuit or components including the attribute information storing unit 34 and the GUI performance information storing unit 36 may be realized as an integrated circuit.

Furthermore, methods of realizing an integrated circuit are not limited to an LSI, and an integrated circuit may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may also be used. Moreover, if techniques for realizing integrated circuits which replace LSIs should emerge due to progress made in semiconductor technology or due to derivative technology, it is obvious that the function blocks may be integrated using such techniques. Integrated circuits that may substitute for LSIs are represented by, for example, those developed by applying biotechnology.

The technical features of the design support device described above can be summarized as follows.

(1) The design support device according to the present invention is a design support device that supports designing of a GUI (graphical user interface), and has: an attribute information storing unit which stores, in advance, attribute information for displaying a GUI that is a display object as an animation; a drawing processing unit which, when a user inputs a drawing start command by using an input device, starts a drawing process of the GUI based on the attribute information and displays the GUI as an animation by redrawing a difference image of consecutive frames in a time series; a redrawing area displaying unit which sets a redrawing area based on an area redrawn by the drawing processing unit and displays an image representing the set redrawing area by overlapping the image on the GUI; and a target redrawing area displaying unit which measures a drawing processing time of an updated frame each time a frame of the GUI is updated by the drawing processing unit, and when the measured drawing processing time exceeds a predetermined reference processing time, calculates a target redrawing area that is drawable within the reference processing time and displays an image representing the calculated target redrawing area by overlapping the image on an excess frame that is a frame at which the drawing processing time exceeds the reference processing time.

According to the configuration described above, a drawing processing time of each frame is measured, and for an excess frame in which the drawing processing time exceeds a reference processing time, an image is displayed which represents a target redrawing area indicating to what size a redrawing area should be reduced to prevent the drawing processing time from exceeding the reference processing time. Accordingly, a user can readily recognize how much the redrawing area should be reduced in the excess frame to prevent the drawing processing time of the excess frame from exceeding the reference processing time. As a result, even a user without expert knowledge regarding hardware and software that execute a GUI can promptly recognize improvements that should be made on a GUI and readily design a GUI that can be smoothly displayed as an animation.

(2) The target redrawing area displaying unit favorably stops the drawing process by the drawing processing unit of a frame subsequent to the excess frame when the drawing processing time exceeds the reference processing time.

According to the configuration described above, in the event that an excess frame is detected when a GUI is displayed as an animation, the animation is stopped in a state in which the excess frame is displayed. Therefore, the user can readily recognize which frame is an excess frame. In addition, since the excess frame is displayed in a stopped state and images representing a redrawing area and a target redrawing area are displayed on the excess frame, the user can readily recognize by how much the redrawing area should be reduced when re-designing the excess frame.

(3) Favorably, the attribute information includes information indicating a display position and a size of a GUI component constituting the GUI in each frame, and the target redrawing area displaying unit judges whether or not the redrawing area in the excess frame has been enlarged from the redrawing area in a frame immediately preceding to the excess frame when the drawing processing time exceeds the reference processing time, and when judgment is made that the redrawing area has been enlarged, the target redrawing area displaying unit extracts a GUI component that is an enlarging factor of the redrawing area and highlights the extracted GUI component in the excess frame.

According to the configuration described above, the user can readily recognize which GUI component needs to be subjected to a display mode change in order to reduce the redrawing area when re-designing the excess frame.

(4) Favorably, the attribute information includes information indicating a transparency of a GUI component constituting the GUI in each frame, and the target redrawing area displaying unit compares attribute information corresponding to the excess frame with attribute information corresponding to a frame immediately preceding to the excess frame when the drawing processing time exceeds the reference processing time, extracts a GUI component whose transparency has changed from non-transparent to semi-transparent, and highlights the extracted GUI component in the excess frame.

When changing a GUI component from non-transparent to semi-transparent, there is a risk of significantly increasing drawing processing time due to reasons such as also having to execute image processing on a background image of the GUI component or on image data of a GUI component behind the GUI component. Therefore, in the present embodiment, when a GUI component that has changed from non-transparent to semi-transparent exists in the excess frame, the GUI component is highlighted. Consequently, the user can readily recognize which GUI component needs to be subjected to a display mode change when performing a design change of a GUI in order to keep the drawing processing time under the reference processing time.

(5) Favorably, the attribute information includes identification information on a GUI component constituting the GUI in each frame, and the target redrawing area displaying unit compares attribute information corresponding to the excess frame with attribute information corresponding to a frame immediately preceding to the excess frame when the drawing processing time exceeds the reference processing time, extracts a GUI that has been newly drawn in the excess frame, and highlights the extracted GUI component in the excess frame.

According to the configuration described above, the user can readily recognize that a newly added GUI component contributes to degradation of GUI performance in an excess frame.

(6) Favorably, the target redrawing area displaying unit calculates the target redrawing area by using a relational expression expressed as "target redrawing area× constant=reference processing time", where "constant=1/drawing processing area per unit time".

According to the configuration described above, a target redrawing area can be clearly defined using the relational expression presented above.

(7) Favorably, the target redrawing area displaying unit calculates a target deletion area indicating a size of a drawing area that should be reduced based on a difference between the drawing processing time and the reference processing time when the drawing processing time exceeds the reference processing time, and displays an image representing the calculated target deletion area.

According to the configuration described above, since a target deletion area is displayed, re-designing that excessively reduces a GUI component can be prevented.

(8) Favorably, a GUI performance managing unit is further provided which stores the drawing processing time of each frame measured by the target redrawing area displaying unit in a storage device in association with attribute information in each frame.

According to the configuration described above, since a drawing processing time and attribute information of each frame are stored in association with each other, a user is able to collate a drawing processing time and attribute information of each frame afterwards, and is therefore provided with useful information when identifying improvements that should be made on a GUI.

The design support device according to the present invention is capable of visualizing and notifying a target redrawing area and a GUI component that is a performance degrading factor to a user in regards to an excess frame in which a drawing processing time exceeds a reference processing time. Therefore, the design support device is useful in optimizing improvements of a GUI based on the visualized information.

The invention claimed is:

1. A design support device that supports designing of a GUI (graphical user interface), comprising:
a hardware processor configured to operate as:
an attribute information storing unit which stores, in advance, attribute information for displaying a GUI that is a display object as an animation;
a drawing processing unit which, when a user inputs a drawing start command by using an input device, starts a drawing process of the GUI based on the attribute information and displays the GUI as an animation by redrawing a difference image of consecutive frames in a time series;
a redrawing area displaying unit which sets a redrawing area based on an area redrawn by the drawing processing unit and displays an image representing the set redrawing area by overlapping the image on the GUI; and
a target redrawing area displaying unit which measures a drawing processing time of an updated frame each time a frame of the GUI is updated by the drawing processing unit, and when the measured drawing processing time exceeds a predetermined reference processing time, calculates a target redrawing area that is drawable within the reference processing time and displays an image representing the calculated target redrawing area by overlapping the image on an excess frame that is a frame at which the drawing processing time exceeds the reference processing time, wherein the reference processing time is calculated in advance based on a drawing processing performance of hardware that executes the GUI and is a predetermined time in which the GUI can be smoothly without stuttering displayed as an animation, and the target redrawing area displaying unit calculates the target redrawing area for the updated frame in which the measured drawing processing time exceeds the predetermined reference processing time by multiplying the reference processing time by a draw processing area per unit time.

2. The design support device according to claim 1, wherein the target redrawing area displaying unit stops the drawing process by the drawing processing unit of a frame subsequent to the excess frame when the drawing processing time exceeds the reference processing time.

3. The design support device according to claim 1, wherein the attribute information includes information indicating a display position and a size of a GUI component constituting the GUI in each frame, and the target redrawing area displaying unit judges whether or not the redrawing area in the excess frame has been enlarged from the redrawing area in a frame immediately preceding to the excess frame when the drawing processing time exceeds the reference processing time, and when judgment is made that the redrawing area has been enlarged, the target redrawing area displaying unit extracts a GUI component that is an enlarging factor of the redrawing area and highlights the extracted GUI component in the excess frame.

4. The design support device according to claim 1, wherein the attribute information includes information indicating a transparency of a GUI component constituting the GUI in each frame, and the target redrawing area displaying unit compares attribute information corresponding to the excess frame with attribute information corresponding to a frame immediately preceding to the excess frame when the drawing processing time exceeds the reference processing time, extracts a GUI component whose transparency has changed from non-transparent to semi-transparent, and highlights the extracted GUI component in the excess frame.

5. The design support device according to claim 1, wherein the attribute information includes identification information on a GUI component constituting the GUI in each frame, and the target redrawing area displaying unit compares attribute information corresponding to the excess frame with attribute information corresponding to a frame immediately preceding to the excess frame when the drawing processing time exceeds the reference processing time, extracts a GUI that has been newly drawn in the excess frame, and highlights the extracted GUI component in the excess frame.

6. The design support device according to claim 1, wherein the target redrawing area displaying unit calculates the target redrawing area by using a relational expression expressed as "target redrawing area×constant=reference processing time", where "constant=1/drawing processing area per unit time".

7. The design support device according to claim 1, wherein the target redrawing area displaying unit calculates a target deletion area indicating a size of a drawing area that should be reduced based on a difference between the drawing processing time and the reference processing time when the drawing processing time exceeds the reference processing time, and displays an image representing the calculated target deletion area.

8. The design support device according to claim 1, further comprising a GUI performance managing unit which stores the drawing processing time of each frame measured by the target redrawing area displaying unit in a storage device in association with attribute information in each frame.

9. A non-transitory computer-readable recording medium which stores a design support program that supports designing of a GUI (graphical user interface), the design support program causing a computer to function as:

an attribute information storing unit which stores, in advance, attribute information for displaying a GUI that is a display object as an animation;

a drawing processing unit which, when a user inputs a drawing start command by using an input device, starts a drawing process of the GUI based on the attribute information and displays the GUI as an animation by redrawing a difference image of consecutive frames in a time series;

a redrawing area displaying unit which sets a redrawing area based on an area redrawn by the drawing processing unit and displays an image representing the set redrawing area by overlapping the image on the GUI; and a target redrawing area displaying unit which measures a drawing processing time of an updated frame each time a frame of the GUI is updated by the drawing processing unit, and when the measured drawing processing time exceeds a predetermined reference processing time, calculates a target redrawing area that is drawable within the reference processing time and displays an image representing the calculated target redrawing area by overlapping the image on an excess frame that is a frame at which the drawing processing time exceeds the reference processing time, wherein the reference processing time is calculated in advance based on a drawing processing performance of hardware that executes the GUI and is a predetermined time in which the GUI can be smoothly without stuttering displayed as an animation, and the target redrawing area displaying unit calculates the target redrawing area for the updated frame in which the measured drawing processing time exceeds the predetermined reference processing time by multiplying the reference processing time by a draw processing area per unit time.

10. A design support method of supporting designing of a GUI (graphical user interface), comprising:

a computer starting, when a user inputs a drawing start command by using an input device, a drawing process of a GUI that is a display object based on attribute information stored in advance for displaying the GUI as an animation, and displaying the GUI as an animation by redrawing a difference image of consecutive frames in a time series;

the computer setting a redrawing area based on an area redrawn in the drawing processing step and displaying an image representing the set redrawing area by overlapping the image on the GUI; and the computer measuring a drawing processing time of an updated frame each time a frame of the GUI is updated in the drawing processing step, and when the measured drawing processing time exceeds a predetermined reference processing time, calculating a target redrawing area that is drawable within the reference processing time and displaying an image representing the calculated target redrawing area by overlapping the image on an excess frame that is a frame at which the drawing processing time exceeds the reference processing time, wherein the reference processing time is calculated in advance based on a drawing processing performance of hardware that executes the GUI and is a predetermined time in which the GUI can be smoothly without stuttering displayed as an animation, and the target redrawing area displaying unit calculates the target redrawing area for the updated frame in which the measured drawing processing time exceeds the predetermined reference processing time by multiplying the reference processing time by a draw processing area per unit time.

11. An integrated circuit that supports designing of a GUI (graphical user interface), comprising:

a hardware processor configured to operate as:

a drawing processing unit which starts, when a user inputs a drawing start command by using an input device, a drawing process of a GUI that is a display object based on attribute information stored in advance for displaying the GUI as an animation, and displays the GUI as an animation by redrawing a difference image of consecutive frames in a time series;

a redrawing area displaying unit which sets a redrawing area based on an area redrawn by the drawing processing unit and displays an image representing the set redrawing area by overlapping the image on the GUI; and a target redrawing area displaying unit which measures a drawing processing time of an updated frame each time a frame of the GUI is updated by the drawing processing unit, and when the measured drawing processing time exceeds a predetermined reference processing time, calculates a target redrawing area that is drawable within the reference processing time and displays an image representing the calculated target redrawing area by overlapping the image on an excess frame that is a frame at which the drawing processing time exceeds the reference processing time, wherein the reference processing time is calculated in advance based on a drawing processing performance of hardware that executes the GUI and is a predetermined time in which the GUI can be smoothly without stuttering displayed as an animation, and the target redrawing area displaying unit calculates the target redrawing area for the updated frame in which the measured drawing processing time exceeds the predetermined reference processing time by multiplying the reference processing time by a draw processing area per unit time.

* * * * *